United States Patent
Wang et al.

(10) Patent No.: US 12,278,943 B2
(45) Date of Patent: Apr. 15, 2025

(54) DISPLAY DEVICE AND DISPLAY METHOD THEREFOR

(71) Applicant: BOE Technology Group Co., Ltd., Beijing (CN)

(72) Inventors: Xuefeng Wang, Beijing (CN); Xi Li, Beijing (CN); Jinghua Miao, Beijing (CN); Longhui Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/290,790

(22) PCT Filed: Jul. 1, 2022

(86) PCT No.: PCT/CN2022/103426
§ 371 (c)(1),
(2) Date: Jan. 21, 2024

(87) PCT Pub. No.: WO2023/005606
PCT Pub. Date: Feb. 2, 2023

(65) Prior Publication Data
US 2024/0251069 A1      Jul. 25, 2024

(30) Foreign Application Priority Data
Jul. 28, 2021 (CN) .......................... 202110859469.0

(51) Int. Cl.
*G06T 7/70* (2017.01)
*H04N 13/366* (2018.01)
(Continued)

(52) U.S. Cl.
CPC ............. *H04N 13/366* (2018.05); *G06T 7/70* (2017.01); *H04N 13/398* (2018.05);
(Continued)

(58) Field of Classification Search
CPC .. H04N 13/366; H04N 13/398; H04N 13/305; H04N 13/00; H04N 13/368;
(Continued)

(56) References Cited

U.S. PATENT DOCUMENTS 10,757,401 B2 *   8/2020   Nadig ................. H04N 13/339
2009/0051699 A1   2/2009   Posa et al.
(Continued)

FOREIGN PATENT DOCUMENTS

CN      101950550 A      1/2011
CN      103595997 A      2/2014
(Continued)

OTHER PUBLICATIONS

CN 202110859469.0 first office action dated Jan. 17, 2024.
(Continued)

*Primary Examiner* — Temesghen Ghebretinsae
*Assistant Examiner* — K. Kiyabu
(74) *Attorney, Agent, or Firm* — IPro, PLLC

(57) ABSTRACT

Provided by the present disclosure are a display device and a display method therefor. By detecting the position of a viewer, the display angle of the scene in an image to be displayed is adjusted according to the position of the viewer so as to adapt to the viewing angle of the viewer. Therefore, the image viewed by the viewer can better conform to the real objective scene, and when the viewing angle changes, different angle pictures of an object can be viewed, thereby improving the display effect.

9 Claims, 7 Drawing Sheets

(51) Int. Cl.
*H04N 13/398* (2018.01)
*H04N 13/305* (2018.01)

(52) U.S. Cl.
CPC ............ *G06T 2207/30196* (2013.01); *G06T 2207/30242* (2013.01); *H04N 13/305* (2018.05)

(58) Field of Classification Search
CPC ............ G06T 7/70; G06T 2207/30196; G06T 2207/30242; G09G 5/00
See application file for complete search history.

(56) References Cited

U.S. PATENT DOCUMENTS

| | | | |
|---|---|---|---|
| 2009/0052027 A1* | 2/2009 | Yamada | G02B 30/27 |
| | | | 359/463 |
| 2010/0002006 A1* | 1/2010 | Mauchly | H04N 13/398 |
| | | | 345/581 |
| 2010/0171697 A1 | 7/2010 | Son et al. | |
| 2011/0304533 A1 | 12/2011 | Kim et al. | |
| 2013/0136302 A1* | 5/2013 | Nam | G06V 40/19 |
| | | | 382/103 |
| 2013/0321246 A1 | 12/2013 | Li et al. | |
| 2014/0043324 A1 | 2/2014 | Xu | |
| 2014/0192168 A1* | 7/2014 | Shimoyama | H04N 13/351 |
| | | | 348/50 |
| 2015/0002643 A1* | 1/2015 | Jung | G02B 30/54 |
| | | | 348/51 |
| 2015/0195502 A1* | 7/2015 | Sumi | H04N 13/366 |
| | | | 348/43 |
| 2016/0219268 A1* | 7/2016 | Ström | H04N 13/398 |
| 2017/0054972 A1 | 2/2017 | Wang | |
| 2019/0320163 A1* | 10/2019 | Posa | H04N 21/44218 |

FOREIGN PATENT DOCUMENTS

| | | |
|---|---|---|
| CN | 103955279 A | 7/2014 |
| CN | 105120251 A | 12/2015 |
| CN | 108364354 A | 8/2018 |
| CN | 110597383 A | 12/2019 |
| EP | 2395759 A1 | 12/2011 |
| WO | 2019134348 A1 | 7/2019 |
| WO | 2022023142 A1 | 2/2022 |

OTHER PUBLICATIONS

CN 202110859469.0 second office action dated Jul. 3, 2024.
PCT/CN2022/103426 international search report dated Sep. 29, 2022.

\* cited by examiner

DISPLAY DEVICE AND DISPLAY METHOD THEREFOR

CROSS-REFERENCE TO RELATED APPLICATIONS

The present application is a National Stage of International Application No. PCT/CN2022/103426, filed Jul. 1, 2022, which claims priority to Chinese Patent Application No. 202110859469.0, filed to China National Intellectual Property Administration on Jul. 28, 2021, the entire contents of which are incorporated by reference in the present application.

TECHNICAL FIELD

The present disclosure relates to the technical field of display, in particular to a display device and a display method therefor.

BACKGROUND

Three-dimensional display technology can provide more realistic and three-dimensional presence, and has become a research hotspot in the display field in recent years. At present, the widely used three-dimensional display uses binocular parallax to form a three-dimensional display effect through brain fusion.

The optimal viewing effect can be realized by a current three-dimensional display device only in a specific viewing region. Beyond this optimal viewing region, the viewing effect decreases, and in addition, the three-dimensional display device also differs from the actual scene viewed by the viewer. When the viewer is located at the optimal viewing region, the viewed three-dimensional image is higher in matching degree with the actual scene; when the viewer is beyond the optimal viewing region, the image viewed by the viewer is still at the same viewing angle, rather than other angles at which objects are viewed as in the actual scene.

SUMMARY

A first aspect of the embodiments of the present disclosure provides a display device, including:
- a three-dimensional display panel, configured to display a three-dimensional image;
- a detection system, configured to detect a position of a viewer; and
- a processor, connected with the three-dimensional display panel and the detection system, and configured to adjust a display angle of a scene in a to-be-displayed image according to the position of the viewer so as to adapt to a viewing angle of the viewer.

In some embodiments of the present disclosure, the viewing region of the three-dimensional display panel is divided into a first viewing region in a center, and a second viewing region and a third viewing region that are at two sides of the first viewing region, respectively; wherein
- a viewing angle corresponding to the first viewing region is equal to a viewing angle corresponding to the second viewing region, and the viewing angle corresponding to the first viewing region is equal to a viewing angle corresponding to the third viewing region; wherein
- a viewing angle corresponding to a viewing region is an included angle between two side edges of the viewing region and a center point of the three-dimensional display panel.

In some embodiments of the present disclosure, the detection system is a camera group integrally installed on a side edge of the three-dimensional display panel; wherein
- the camera group includes three cameras, which are a first camera, a second camera, and a third camera, respectively; wherein the first camera is configured to shoot an image of the first viewing region, the second camera is configured to shoot an image of the second viewing region, and the third camera is configured to shoot an image of the third viewing region.

In some embodiments of the present disclosure, the detection system is a wide-angle camera installed on a side edge of the three-dimensional display panel; wherein
- the shooting field of view of the wide-angle camera covers the first viewing region, the second viewing region and the third viewing region; and the wide-angle camera is configured to shoot images of the first viewing region, the second viewing region and the third viewing region.

In some embodiments of the present disclosure, the detection system is a distance sensor or a thermal tracker installed on a side edge of the three-dimensional display panel; or
- the detection system is a gravity sensor installed on the ground at the light-exiting side of the three-dimensional display panel.

In some embodiments of the present disclosure, the three-dimensional display panel includes:
- a display screen, including a first pixel unit configured to display a left-eye image and a second pixel unit configured to display a right-eye image; and
- a lenticular lens array at a light-exiting side of the display screen; wherein pixel units of the display screen are on a focal plane of the lenticular lens array.

A second aspect of the embodiments of the present disclosure provides a display method for the display device, including:
- detecting a position of a viewer; and
- adjusting a display angle of a scene in a to-be-displayed image according to the position of the viewer so as to adapt to a viewing angle of the viewer.

In some embodiments of the present disclosure, a viewing region of a three-dimensional display panel of the display device is divided into a first viewing region in the center, and a second viewing region and a third viewing region that are at two sides of the first viewing region, respectively; wherein
- the detecting a position of a viewer includes:
- determining a viewing region where the viewer is located, and determining the viewing region where the viewer is located as an optimal viewing region;
- the adjusting a display angle of a scene in a to-be-displayed image according to the position of the viewer includes:
- adjusting the scene in the to-be-displayed image to a display angle adapting to the optimal viewing region.

In some embodiments of the present disclosure, the determining a viewing region where the viewer is located, and determining the viewing region where the viewer is located as an optimal viewing region includes:
- determining a quantity that indicates how many viewers;
- determining the viewing region where the viewer is located as the optimal viewing region when the quantity is equal to 1; and
- determining the first viewing region as the optimal viewing region when the quantity is greater than 1.

In some embodiments of the present disclosure, the determining a viewing region where the viewer is located, and determining the viewing region where the viewer is located as an optimal viewing region includes:
  determining a quantity that indicates how many viewers;
  determining the viewing region where the viewer is located as the optimal viewing region when the quantity is equal to 1; and
  determining a viewing region containing the largest quantity that indicates how many viewers as the optimal viewing region when the quantity is greater than 1.

In some embodiments of the present disclosure, the determining a viewing region where the viewer is located, and determining the viewing region where the viewer is located as an optimal viewing region includes:
  determining a quantity that indicates how many viewers;
  determining the viewing region where the viewer is located as the optimal viewing region when the quantity is equal to 1; and
  determining a viewing region where a viewer located in the middle position is located as the optimal viewing region when the quantity is greater than 1.

In some embodiments of the present disclosure, the detection system is a camera group integrally installed on a side edge of the three-dimensional display panel, wherein the camera group includes a first camera, a second camera, and a third camera; wherein the first camera is configured to shoot an image of the first viewing region, the second camera is configured to shoot an image of the second viewing region, and the third camera is configured to shoot an image of the third viewing region;
  the determining a viewing region where the viewer is located, and determining the viewing region where the viewer is located as an optimal viewing region includes:
  shooting images by the first camera, the second camera and the third camera simultaneously;
  determining, when the first camera shoots an image of the viewer, that the viewer is currently in the first viewing region, and determining the first viewing region as the optimal viewing region;
  determining, when the second camera shoots an image of the viewer, that the viewer is currently in the second viewing region, and determining the second viewing region as the optimal viewing region; and
  determining, when the third camera shoots an image of the viewer, that the viewer is currently in the third viewing region, and determining the third viewing region as the optimal viewing region.

In some embodiments of the present disclosure, the detection system is a wide-angle camera installed on the side edge of the three-dimensional display panel; the shooting field of view of the wide-angle camera covers the first viewing region, the second viewing region and the third viewing region; and the wide-angle camera is configured to shoot images of the first viewing region, the second viewing region and the third viewing region;
  the determining a viewing region where the viewer is located, and determining the viewing region where the viewer is located as an optimal viewing region includes:
  shooting images of the first viewing region, the second viewing region and the third viewing region by the wide-angle camera;
  determining position coordinates of the viewer relative to the three-dimensional display panel when the image of the viewer is shot; and
  determining the viewing region where the viewer is currently located according to the position coordinates, and determining the viewing region where the viewer is located as the optimal viewing region.

In some embodiments of the present disclosure, the determining the viewing region where the viewer is currently located according to the position coordinates includes: determining that the viewer is currently in the second viewing region when $px<0$, and $-px/py>\tan\theta/2$;
  determining that the viewer is currently in the third viewing region when $px>0$, and $px/py>\tan\theta/2$; and
  determining that the viewer is currently in the first viewing region when $px<0$, and $-px/py\leq\tan\theta/2$, or when $px>0$, and $px/py\leq\tan\theta/2$;
  wherein $(px,py)$ is the position coordinates of the viewer relative to the three-dimensional display panel; and the viewing angle corresponding to the first viewing region, the viewing angle corresponding to the second viewing region and the viewing angle corresponding to the third viewing region are all $\theta$.

In some embodiments of the present disclosure, the adjusting the scene in the to-be-displayed image to the display angle adapting to the optimal viewing region includes:
  displaying the image directly when the viewer is currently in the first viewing region;
  rotating the scene in the to-be-displayed image clockwise by a set angle and then displaying the image when the viewer is currently in the second viewing region; and
  rotating the scene in the to-be-displayed image counterclockwise by a set angle and then displaying the image when the viewer is currently in the third viewing region; wherein
  the viewing angle corresponding to the first viewing region is equal to the viewing angle corresponding to the second viewing region and the viewing angle corresponding to the third viewing region; the set angle is equal to the viewing angle corresponding to the first viewing region.

BRIEF DESCRIPTION OF FIGURES

In order to more clearly illustrate the technical solutions of the embodiments of the disclosure, the accompanying drawings required to be used in the embodiments are simply introduced below. Obviously, the accompanying drawings in the description below are only some embodiments of the present disclosure, and a person having ordinary skill in the art can obtain other drawings according to these accompanying drawings without inventive efforts.

Figure 1:
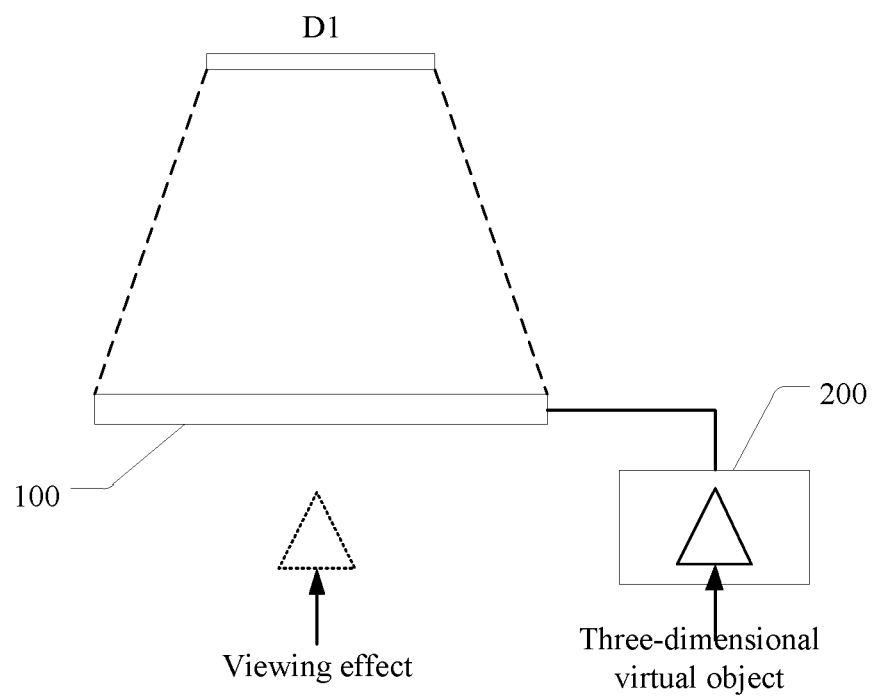
FIG. 1 is a first structural schematic diagram of a display device provided by an embodiment of the present disclosure.

In the figures, 100—three-dimensional display panel, 200—processor, 300—detection system, 11—display screen, 12—lenticular lens array, c1—first camera, c2—second camera, c3—third camera, D1—first viewing region, D2—second viewing region, and D3—third viewing region.

DETAILED DESCRIPTION

In order to make the above purposes, features and advantages of the disclosure more obvious and easier to understand, the disclosure will be further described in combination with accompanying drawings and embodiments. However, exemplary embodiments may be implemented in various forms, and should not be understood as a limitation to the embodiments set forth herein; rather, these embodiments are provided so that the disclosure will be thorough and complete, and will fully convey the concepts of example embodiments to those skilled in the art. The same reference numerals in the drawings represent the same or similar structures, so that repeated descriptions thereof will be omitted. Terms for describing positions and directions in the present disclosure are all explained by taking the drawings as examples, but can also be subjected to changes according to needs, and the changes are included in the protection scope of the present disclosure. The drawings of the present disclosure are only used to indicate that the relative position relationship and do not represent true scales.

The real world is a three-dimensional space, and there are three-dimensional dimensions and spatial position relationships among objects in the three-dimensional space. The human eye has a stereoscopic vision ability due to the distance between the two eyes, which acquire information about the same scene from different positions, each obtaining a two-dimensional image of the scene, while there is a slight difference between the image obtained by the left eye and the image obtained by the right eye, which difference is called parallax. The human brain analyzes and processes the left and right images and the parallax of the two images to obtain information about the brightness, shape, color, spatial distribution of the scene. The human brain can obtain information about the brightness, shape, color and spatial distribution of the scene by analyzing and processing the left and right images and the parallax of the two images.

In order to reproduce the scene of the objective world, three-dimensional display devices have been developed. The three-dimensional display device can exhibit a sense of depth, a sense of hierarchy, and a sense of realism of an image, and a realistic distribution of the image, and a viewer can obtain the same perception as viewing an objective world.

FIG. 1 is a first structural schematic diagram of a display device provided by an embodiment of the present disclosure.

As shown in FIG. 1, the display device provided by the embodiment of the present disclosure is a three-dimensional display device, configured to display a three-dimensional stereoscopic image, and enhance the viewing experience of a viewer. The display device includes a three-dimensional display panel 100 and a processor 200 connected to the three-dimensional display panel 100.

The processor 200 is configured to process image data to be displayed, form a driving signal for driving the three-dimensional display panel to display an image, and output the driving signal to the three-dimensional display panel 100, and the three-dimensional display panel 100 is driven by the driving signal to display the three-dimensional image.

Figure 2:
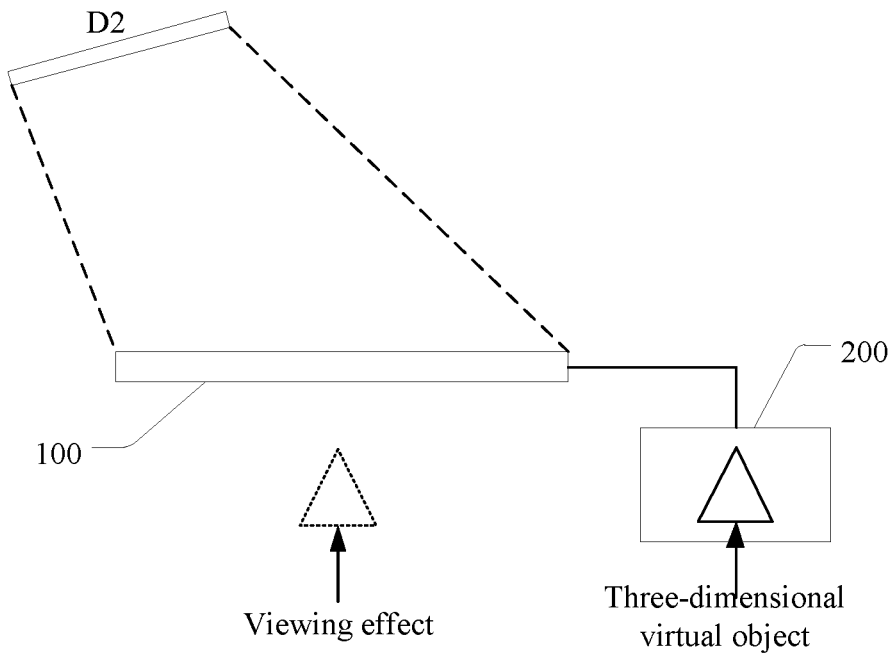
FIG. 2 is a first schematic diagram of an image display effect provided by the embodiment of the present disclosure.

However, the current three-dimensional display device can only display a three-dimensional image at a fixed viewing angle, and when the position of the viewer changes, the viewing angle of the viewer changes accordingly, so that the current three-dimensional display device cannot adjust the displayed image with the change of the viewing angle of the viewer. FIG. 2 is a first schematic diagram of an image display effect provided by the embodiment of the present disclosure; and FIG. 3 is a second schematic diagram of an image display effect provided by the embodiment of the present disclosure.

As shown in FIG. 1, in the embodiments of the present disclosure, a viewing region located directly in front of the three-dimensional display panel 100 is referred to as a first viewing region D1. When the viewer is located in the first viewing region D1, if a three-dimensional virtual object in a to-be-displayed image obtained by the processor at this time is a frontally placed triangle, the image viewed in the first viewing region D1 is the front of the triangle.

Figure 3:
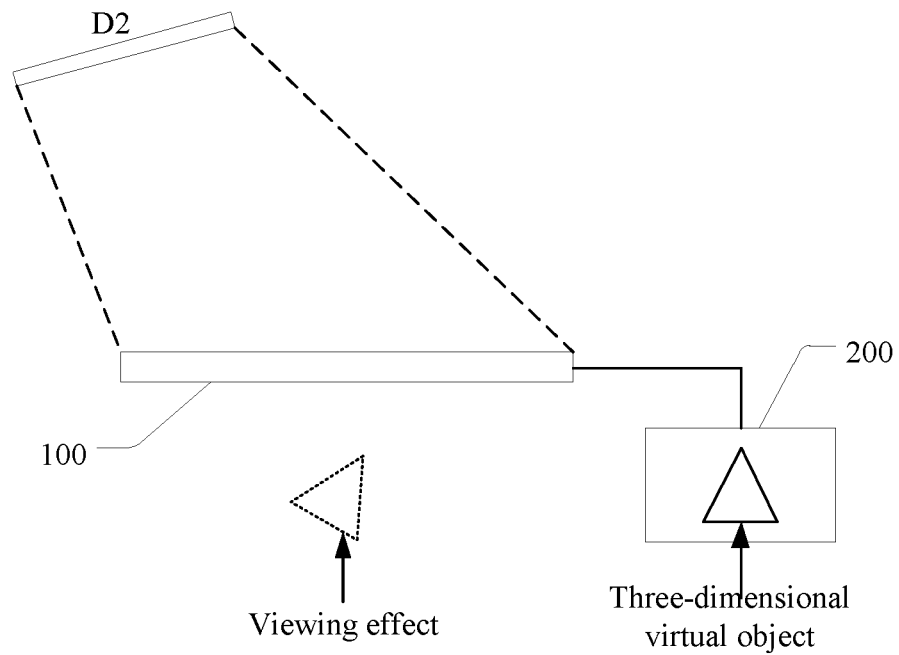
FIG. 3 is a second schematic diagram of an image display effect provided by the embodiment of the present disclosure.

As shown in FIGS. 2 and 3, in embodiments of the present disclosure, a viewing region located obliquely in front of the three-dimensional display panel 100 and adjacent to the first viewing region D1 is referred to as a second viewing region D2. When the viewer is located in the second viewing region D2, it is equivalent to the viewer changing the viewing angle of the three-dimensional display panel. However, when the current display device is adopted, the image viewed in the second viewing region D2 is still the frontally placed triangle shown in FIG. 2.

In a real viewing scene, when the position of the viewer changes, the viewing angle of the same object also changes, and the viewed same object should be displayed at different angles, instead of being displayed at the same angle at all viewing angles. Thus, if the viewer is located in the second viewing region D2, according to the law that human eyes view the objective world, what the viewer should see is the side face of the triangle as shown in FIG. 3, rather than the front of the triangle as shown in FIG. 2.

In view of this, the embodiments of the present disclosure provide a display device, which can adjust the display angle of the scene in the to-be-displayed image according to the viewing angle of the viewer, so as to better conform to the law of the human eye in viewing the objective world, and optimize the three-dimensional display effect.

Figure 4:
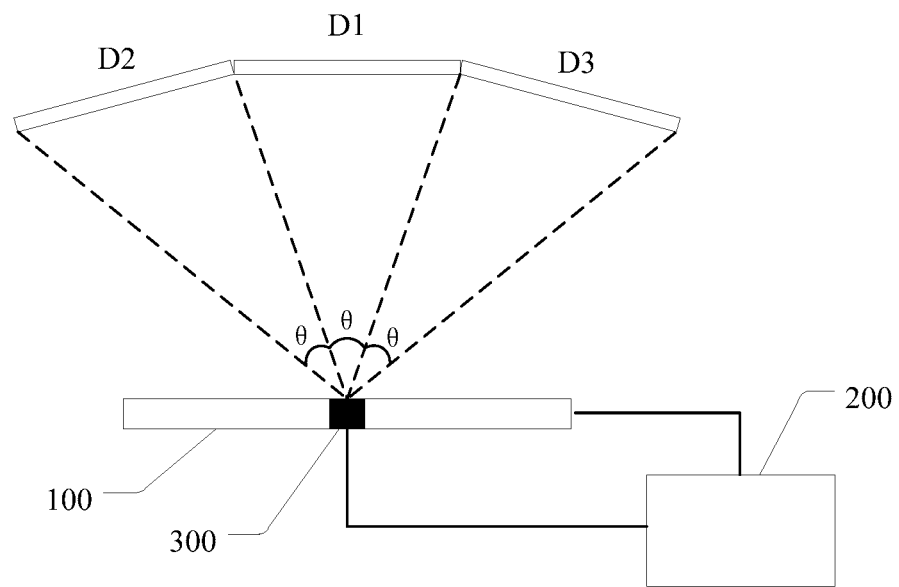
FIG. 4 is a second structural schematic diagram of a display device provided by an embodiment of the present disclosure.

FIG. 4 is a second structural schematic diagram of a display device provided by an embodiment of the present disclosure.

As shown in FIG. 4, the display device provided by an embodiment of the present disclosure further includes: a detection system 300, connected with the processor 200 and configured to detect the position of the viewer. The detection system 300 transmits the detected position information of the viewer to the processor 200, and the processor 200 adjusts the display angle of the scene in the to-be-displayed image according to the position of the viewer so as to adapt to the viewing angle of the viewer. Therefore, the image viewed by the viewer can better conform to the real objective scene, and when the viewing angle changes, different angle pictures of an object can be viewed.

During specific implementation, as shown in FIG. 4, the viewing region of the display panel is divided into a first viewing region D1 located in the center, and a second viewing region D2 and a third viewing region D3 that are located on two sides of the first viewing region D1, respectively. The first viewing region D1 is a viewing region located directly in front of the three-dimensional display panel 100, and the second viewing region D2 and the third viewing region D3 are viewing regions located obliquely in front of the three-dimensional display panel 100. In addition, if the viewing angle of the three-dimensional display panel 100 is large, the two sides of the second viewing region D2 and the two sides of the third viewing region D3 may be provided with viewing regions, respectively, and no limitation is made thereto.

In an embodiment of the present disclosure, the viewing angle corresponding to the first viewing region D1, the viewing angle corresponding to the second viewing region D2 and the viewing angle corresponding to the third viewing region D3 are equal; wherein the viewing angle corresponding to the viewing region is the included angle between two side edges of the viewing region and the center point of the three-dimensional display panel.

Partitioning the viewing field of view according to the same viewing angle is conducive to simplifying angular adjustment of the image. The viewing angle corresponding to the first viewing region D1 located in the center is generally the optimal viewing angle of the three-dimensional display panel 100, and the viewing effect within this field of view is optimal. As shown in FIG. 4, in the embodiments of the present disclosure, the viewing angle corresponding to the optimal viewing region is θ, and the second viewing region D2 and the third viewing region D3 are formed with the viewing angle θ corresponding to the optimal viewing region as a unit. As shown in FIG. 4, the viewing angle corresponding to the second viewing region D2 is also θ, and the viewing angle corresponding to the third viewing region D3 is also θ. The viewing angles corresponding to the three viewing regions are equal, but the orientations corresponding to the three viewing regions are not the same.

Figure 5:
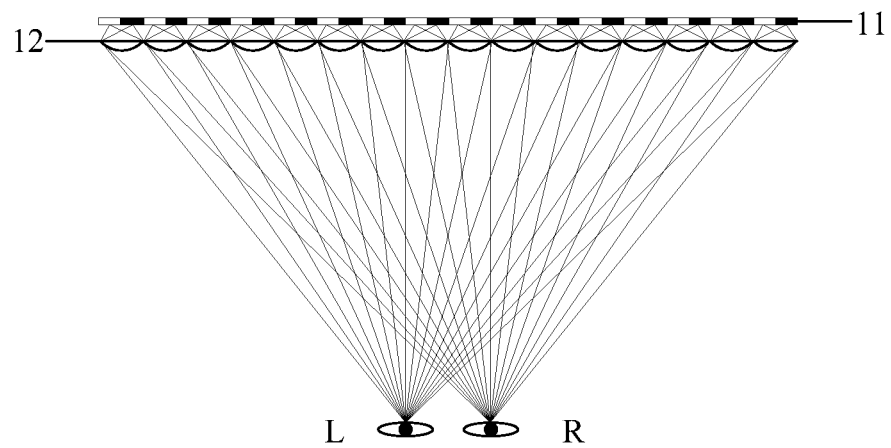
FIG. 5 is a structural schematic diagram of a three-dimensional display panel provided by an embodiment of the present disclosure.

FIG. 5 is a structural schematic diagram of a three-dimensional display panel provided by an embodiment of the present disclosure.

As shown in FIG. 5, the three-dimensional display panel includes a display screen 11 and a lenticular lens array 12.

The display screen 11 includes first pixel units configured to display a left-eye image, and second pixel units configured to display a right-eye image. In general, first pixel unit columns constituted by the first pixel units and second pixel unit columns constituted by the second pixel units are alternately arranged.

The lenticular lens array 12 is located at the light-exiting side of the display screen 11. The lenticular lens array 12 includes a plurality of lenticular lenses arranged in parallel, wherein the extending direction of the lenticular lenses are the same as the direction of the pixel unit columns, and one lenticular lens may correspond to one or more pixel unit columns.

The pixel units of the display screen 11 are located at the focal plane of the lenticular lens array 12, so that the left-eye image and the right-eye image can be separated under the action of the lenticular lens array 12, and are received by two eyes of a person, respectively to form parallax, and a three-dimensional stereoscopic image is fused in the brain.

In addition, the three-dimensional display panel 100 may also adopt display panels displaying three-dimensional images using other principles, the embodiments of the present disclosure are only adopted for exemplification, the present disclosure does not specifically limit three-dimensional display panels of other structures.

Figure 6:
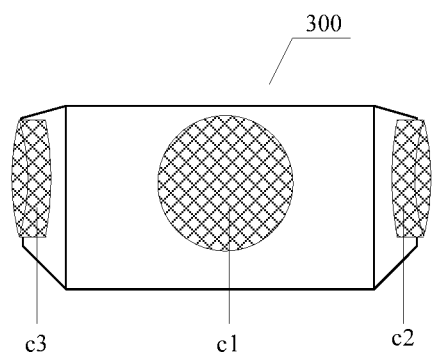
FIG. 6 is a structural schematic diagram of a detection system provided by an embodiment of the present disclosure.
Figure 7:
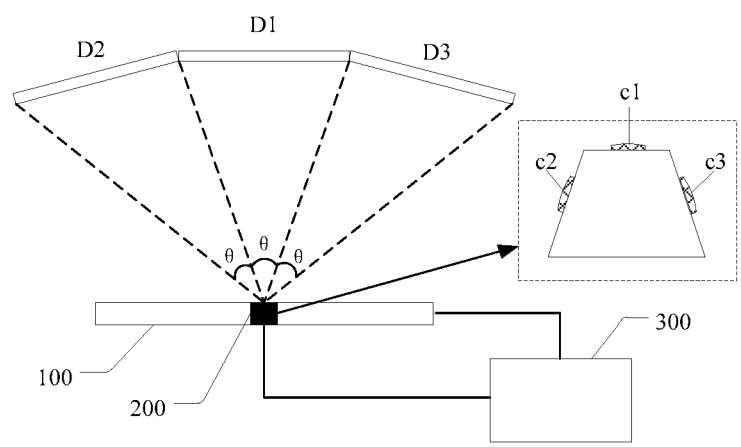
FIG. 7 is a third structural schematic diagram of a display device provided by an embodiment of the present disclosure.

FIG. 6 is a structural schematic diagram of a detection system provided by an embodiment of the present disclosure; and FIG. 7 is a third structural schematic diagram of a display device provided by an embodiment of the present disclosure.

As shown in FIGS. 6 and 7, in some embodiments, the detection system 300 is a camera group integrally installed on the side edge of the three-dimensional display panel; wherein the camera group includes three cameras, which are a first camera c1, a second camera c2, and a third camera c3, respectively; wherein the first camera c1 is configured to shoot images of the first viewing region D1, the second camera c2 is configured to shoot images of the second viewing region D2, and the third camera c3 is configured to shoot images of the third viewing region D3.

During specific implementation, the shooting angles of the three cameras may be equal to the viewing angles corresponding to the viewing regions, so that it may be determined that which viewing region where the viewer is located according to which camera shoots the image.

Specifically, the three cameras in the camera group are connected to the processor 200, and the processor 200 can determine the viewing region where the viewer is located when it is determined that the image of the viewer is shot by at least one of the cameras by detecting the images shot by the three cameras.

For example, when the first camera c1 shoots an image of the viewer while neither the second camera c2 nor the third camera c3 shoots an image of the viewer, it may be determined that the viewer is located within the first viewing region D1.

Figure 8:
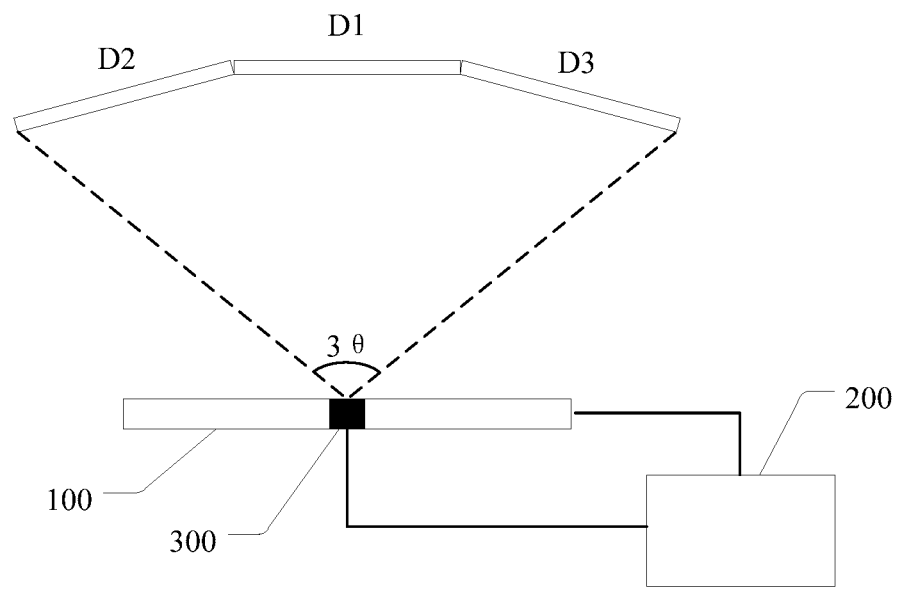
FIG. 8 is a fourth structural schematic diagram of a display device provided by an embodiment of the present disclosure.

FIG. 8 is a fourth structural schematic diagram of a display device provided by an embodiment of the present disclosure.

As shown in FIG. 8, in some embodiments, the detection system is a wide-angle camera installed on the side edge of the three-dimensional display panel; the shooting field of view of the wide-angle camera covers the first viewing region D1, the second viewing region D2 and the third viewing region D3. The wide-angle camera is configured to shoot images of the first viewing region D1, the second viewing region D2 and the third viewing region D3.

As shown in FIG. 8, the shooting angle of the wide-angle camera is 3θ and covers the three viewing regions, so no matter which viewing region the viewer is located in, the wide-angle camera can shoot the image of the viewer, and then further determine the viewing region where the viewer is located.

Figure 9:
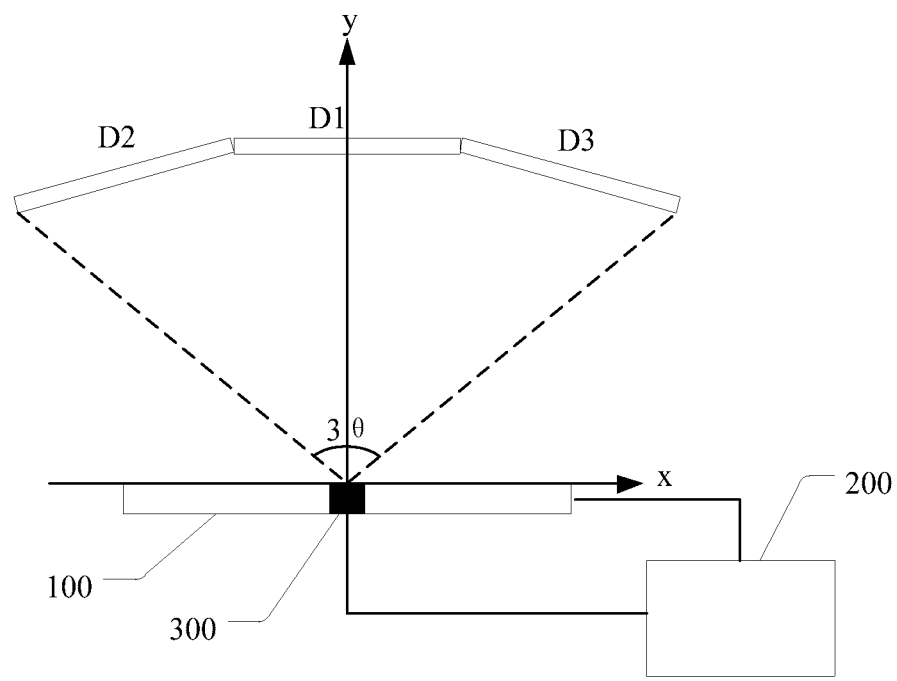
FIG. 9 is a schematic diagram of position coordinates provided by an embodiment of the present disclosure.

FIG. 9 is a schematic diagram of position coordinates provided by an embodiment of the present disclosure.

As shown in FIG. 9, when the wide-angle camera is employed to determine the viewing region where the viewer is located, coordinate axes may be set in the plane where the three-dimensional display panel 100 is located and the plane perpendicular to the three-dimensional display panel 100, thereby determining which viewing region the viewer is located in according to the detected position coordinates of the viewer.

For example, (px,py) is the position coordinates of the viewer relative to the three-dimensional display panel; and the viewing angles corresponding to the first viewing region D1, the second viewing region D2 and the third viewing region D3 are all θ.

It is determined that the viewer is currently located in the second viewing region when px<0, and −px/py>tan θ/2; it is determined that the viewer is currently located in the third viewing region when px>0, and px/py>tan θ/2; and it is determined that the viewer is currently located in the first viewing region when px<0, and −px/py≤tan θ/2, or when px>0, and px/py≤tan θ/2.

Therefore, the viewing region of the viewer can be determined by using the tangent relationship, and then the display angle of the image can be adjusted according to the position of the viewer so as to adapt to the viewing angle of the viewer.

In addition, in some embodiments, the detection system 300 may also be a distance sensor or a thermal tracker installed on the side edge of the three-dimensional display panel 100. When the distance sensor is used, the position coordinates of the viewer can be determined by detecting the distance from the viewer to the two coordinate axes shown in FIG. 9, respectively. When the thermal tracker is used, the position of the viewer can be determined by detecting infrared information and the like.

In addition, in some embodiments, the detection system 300 may also be a gravity sensor installed on the ground at the light-exiting side of the three-dimensional display panel 100. The position of the viewer is detected by the gravity sensor so as to determine which viewing region the viewer is located in.

During specific implementation, it is also possible to determine the position of the viewer by other means, thereby determining the viewing region where the viewer is located, and the embodiments of the present disclosure are only adopted for exemplification. Any solution that uses the idea of this disclosure to adjust the display angle of the to-be-displayed image according to the position of the viewer and only differs in the means of determining the position of the viewer belongs to the protection scope of this disclosure.

Another aspect of the embodiments of the present disclosure provides a display method for any one of the above display devices.

Figure 10:
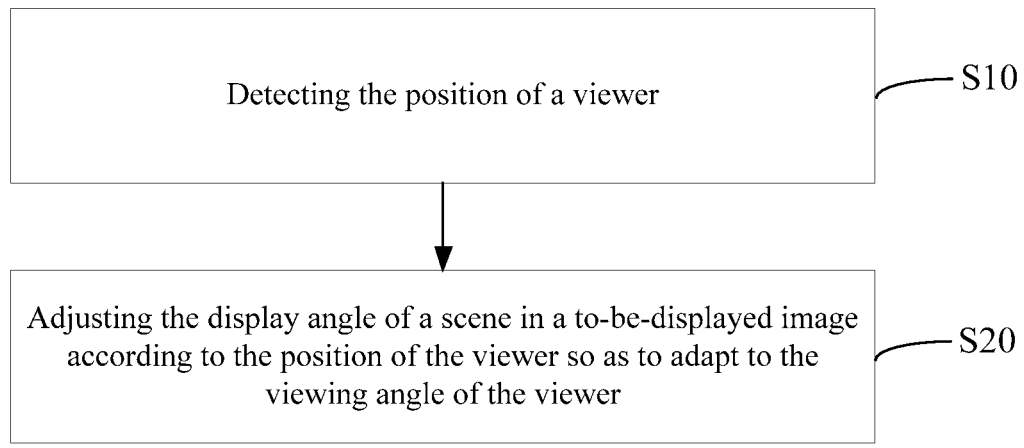
FIG. 10 is a flowchart of a display method for a display device provided by an embodiment of the present disclosure.

FIG. 10 is a flowchart of a display method for a display device provided by an embodiment of the present disclosure.

As shown in FIG. 10, a display method of the display device includes: S10, detecting the position of a viewer; and S20, adjusting the display angle of the scene in a to-be-displayed image according to the position of the viewer so as to adapt to the viewing angle of the viewer.

By detecting the position of the viewer, the display angle of the scene in the to-be-displayed image is adjusted according to the position of the viewer so as to adapt to the viewing angle of the viewer. Therefore, the image viewed by the viewer can better conform to the real objective scene, and when the viewing angle changes, different angle pictures of an object can be viewed.

During specific implementation, the viewing region of a display panel is divided into a first viewing region located in the center, and a second viewing region and a third viewing region that are located at two sides of the first viewing region, respectively.

In the above step S10, the detecting the position of a viewer specifically includes: determining a viewing region where the viewer is located, and determining the viewing region where the viewer is located as an optimal viewing region.

In the above step S20, the adjusting the display angle of the scene in a to-be-displayed image according to the position of the viewer specifically includes: adjusting the scene in the to-be-displayed image to a display angle adapting to the optimal viewing region.

It can be understood that the three-dimensional display panel needs to adjust the display angle of the image according to the position where the viewer is located, and the display angle can match the viewing angle of the viewer, so the embodiment of the present disclosure determines the region where the viewer is located as the optimal viewing region, and the image displayed by the three-dimensional display panel adapts to the viewing angle of the optimal viewing region.

In some embodiments, there may be situations where multiple viewers view an image at the same time. At this time, it is necessary to determine one of the first viewing region, the second viewing region and the third viewing region as the optimal viewing region.

In some embodiments, the quantity that indicates how many viewers is determined first. When the quantity is equal to 1, the viewing region where this viewer is located is determined as the optimal viewing region. When the quantity is greater than 1, the first viewing region is determined as the optimal viewing region.

When the quantity is 1, at this time, the region where this viewer is located is taken as the optimal viewing region, and the three-dimensional display device adjusts the display angle of the image according to the optimal viewing region where the viewer is located.

When the quantity is greater than 1, at this time, taking any viewing region as the optimal viewing region may cause the viewing effect of viewers in other viewing regions other than this viewing region to be reduced, so the embodiment of the present disclosure takes the first viewing region located in the center as the optimal viewing region, and directly displays the image without adjusting the angle of the image, thereby simplifying the workflow.

In some embodiments, the quantity that indicates how many viewers is determined first; when the quantity is equal to 1, the viewing region where this viewer is located is determined as the optimal viewing region; and when the quantity is greater than 1, the viewing region containing the largest quantity that indicates how many viewers is determined as the optimal viewing region.

When the quantity is 1, at this time, the region where this viewer is located is taken as the optimal viewing region, and the three-dimensional display device adjusts the display angle of the image according to the optimal viewing region where the viewer is located.

When the quantity is greater than 1, it can be determined first which viewing region contains more viewers, the viewing region containing the largest quantity that indicates how many viewers is taken as the optimal viewing region, and the display angle of the image is adjusted according to the optimal viewing region so as to adapt to the viewing angle of the optimal viewing region, so as to meet the viewing needs of most viewers and improve the viewing experience of most viewers.

In some embodiments, the quantity that indicates how many viewers is determined first; when the quantity is equal to 1, the viewing region where this viewer is located is determined as the optimal viewing region; and when the quantity is greater than 1, the viewing region where the viewer located at the middle position is located is determined as the optimal viewing region.

When the quantity is 1, at this time, the region where this viewer is located is taken as the optimal viewing region, and the three-dimensional display device adjusts the display angle of the image according to the optimal viewing region where the viewer is located.

When the quantity is greater than 1, the viewing region where the viewer located at the middle position is located may be determined as the optimal viewing region. As will be appreciated, in general, the viewing angle of the display device is centrally symmetric, so that a viewer located in the middle may be regarded as the most important viewer, and thus the viewing region where this viewer is located is determined as the optimal viewing region.

In addition, when the quantity is greater than 1, the viewing region where a viewer closest to the three-dimensional display panel is located may be determined as the optimal viewing region.

During specific implementation, the optimal viewing region may be determined according to other rules, which are not limited here.

The following specifically illustrates the display method provided by the embodiment of the present disclosure in a case where only one viewer views an image.

In some embodiments, the detection system is a camera group integrally installed on the side edge of the three-dimensional display panel, and the camera group includes a first camera, a second camera and a third camera. The three-dimensional display panel and the first camera, the second camera, and the third camera are connected with the processor.

The first camera is configured to shoot an image of the first viewing region, the second camera is configured to shoot an image of the second viewing region, and the third camera is configured to shoot an image of the third viewing region. The shooting fields of view of the three cameras match the viewing angles corresponding to the three viewing regions, and the shooting fields of view of the three cameras do not overlap with each other.

The processor drives the first camera, the second camera and the third camera to shoot images simultaneously and acquires the images shot by the first camera, the second camera, and the third camera. When the image of the viewer is shot by the first camera, it is determined that the viewer is currently located in the first viewing region, and the first viewing region is determined as the optimal viewing region; when the image of the viewer is shot by the second camera, it is determined that the viewer is currently located in the second viewing region, and the second viewing region is determined as the optimal viewing region; and when the image of the viewer is shot by the third camera, it is determined that the viewer is currently located in the third viewing region, and the third viewing region is determined as the optimal viewing region.

Thus, the processor may determine the viewing region corresponding to one of the first camera, the second camera and the third camera that shoots the image of the viewer as the optimal viewing region.

In some embodiments, the detection system is a wide-angle camera installed on the side edge of the three-dimensional display panel, and the three-dimensional display panel and the wide-angle camera are connected to the processor.

The shooting field of view of the wide-angle camera covers the first viewing region, the second viewing region and the third viewing region. The wide-angle camera is configured to shoot images of the first viewing region, the second viewing region and the third viewing region.

The processor drives the wide-angle camera to shoot images of the first viewing region, the second viewing region and the third viewing region and acquires the images shot by the wide-angle camera. When the image of the viewer is shot, the processor can determine the position coordinates of the viewer in the coordinate system shown in FIG. 9 according to the position of the viewer relative to the three-dimensional display panel; and the viewing region where the viewer is currently located is determined based on the position coordinates, and the viewing region where the viewer is located is determined as the optimal viewing region.

Specifically, the viewing angles corresponding to the first viewing region, the second viewing region and the third viewing region are all θ, and (px,py) is the position coordinates of the viewer relative to the three-dimensional display panel.

It is determined that the viewer is currently located in the second viewing region when px<0, and −px/py>tan θ/2; it is determined that the viewer is currently located in the third viewing region when px>0, and px/py>tan θ/2; and it is determined that the viewer is currently located in the first viewing region when px<0, and −px/py≤tan θ/2, or when px>0, and px/py≤tan θ/2.

The viewing angles corresponding to the first viewing region, the second viewing region and the third viewing region are all θ, and are connected to each other, so that the position of the viewer can be calculated from the position coordinates (px,py) of the viewer, thereby determining which viewing region the viewer is currently located in.

After determining the optimal viewing region where the viewer is located, the processor may calculate the quantity that indicates how many images to be displayed, thereby changing the display angle of the scene in the images to be displayed.

Specifically, when the viewer is currently located in the first viewing region, indicating that the viewer is located directly in front of the three-dimensional display panel, and at this time, the image is displayed directly without adjusting the scene in the to-be-displayed image.

When the viewer is currently located in the second viewing region or the third viewing region, the viewing angle of the viewer changes, so it is necessary to adjust the angle of the scene in the to-be-displayed image so as to adapt to the viewing angle of the viewer.

Figure 11A:
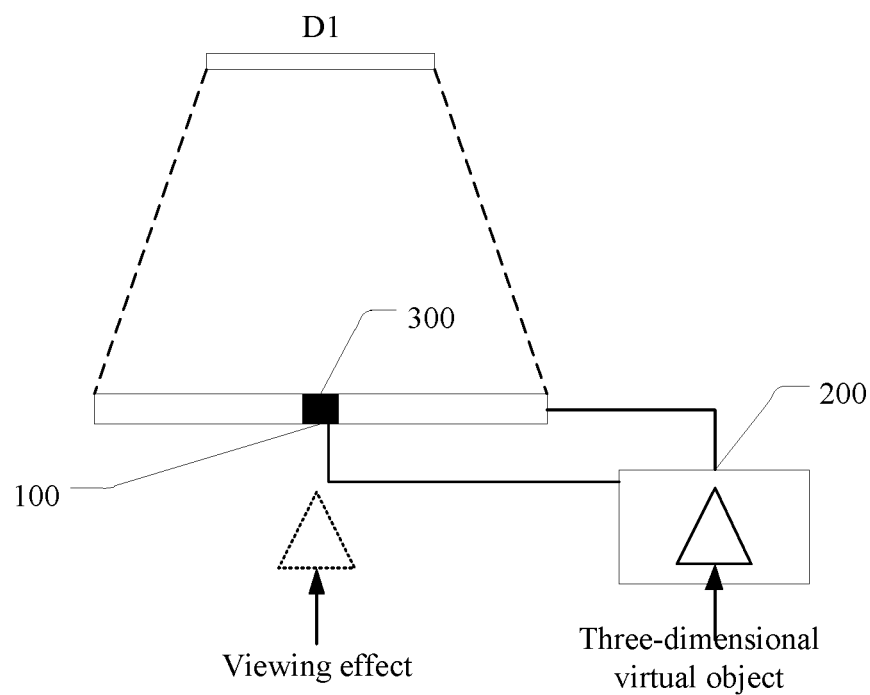
FIGS. 11A-11C are first schematic diagrams of image display effects provided by an embodiment of the present disclosure.
Figure 11B:
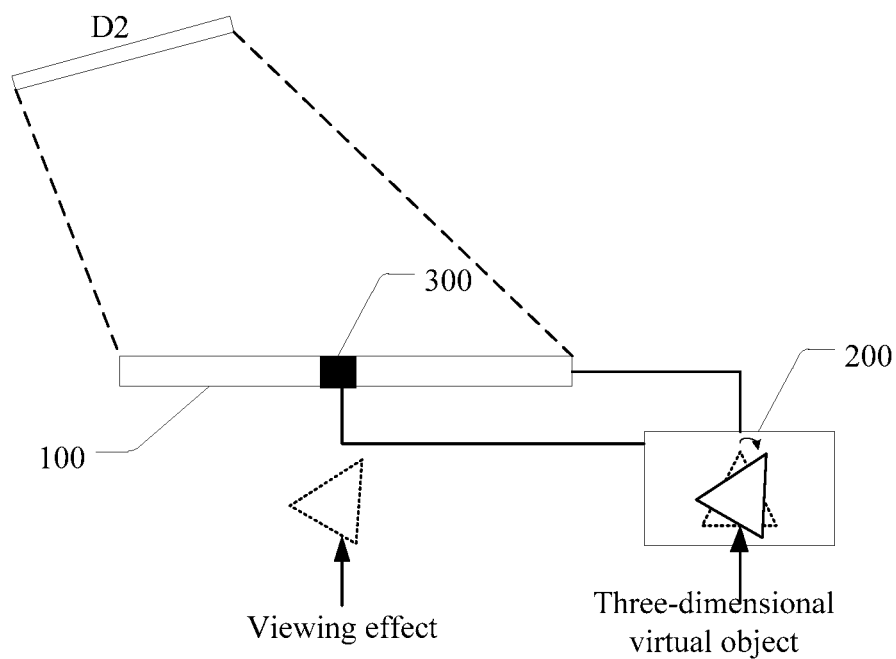
Figure 11C:
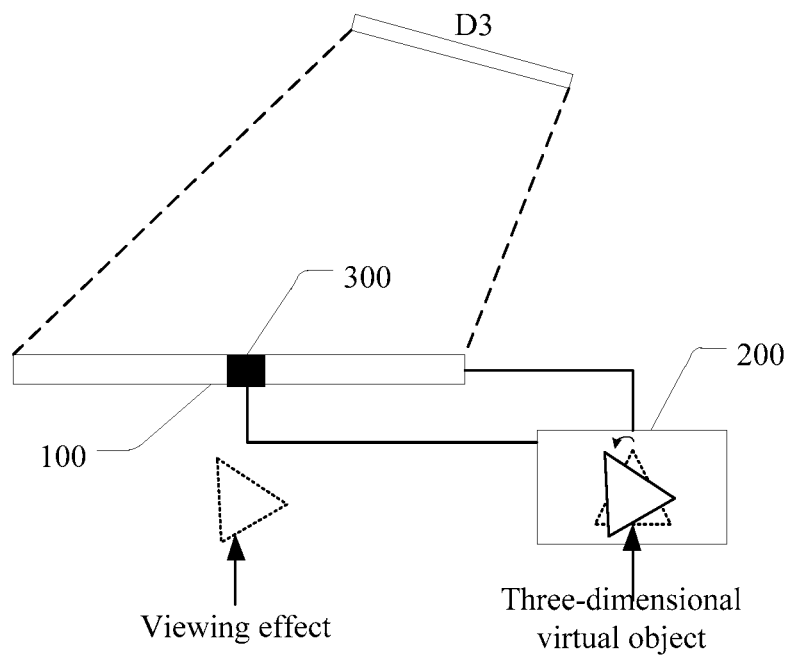

In some embodiments, the scene in the to-be-displayed image may be rotated such that the display angle of the image changes. FIGS. 11A-11C are first schematic diagrams of image display effects provided by an embodiment of the present disclosure.

As shown in FIG. 11A, when the viewer is located in the first viewing region D1, the processor 200 does not process data of the to-be-displayed image, but directly drives the three-dimensional display panel 100 to display the image. The three-dimensional virtual object in the to-be-displayed image is a triangle, and the viewer can view the front of the triangle.

As shown in FIG. 11B, when the viewer is located in the second viewing region D2, the viewer moves to the left front as compared to the straight front of the three-dimensional display panel, at this time, the scene in the to-be-displayed image may be rotated clockwise by a set angle to display the image. The three-dimensional virtual object in the to-bedisplayed image is a triangle, and the triangle is rotated clockwise by a set angle, so that the viewer can view the left side face of the triangle.

As shown in FIG. 11C, when the viewer is located in the third viewing region D3, the viewer moves to the right front as compared to the straight front of the three-dimensional display panel, at this time, the scene in the to-be-displayed image may be rotated counterclockwise by a set angle to display the image. The three-dimensional virtual object in the to-be-displayed image is a triangle, and the triangle is rotated counterclockwise by a set angle, so that the viewer can view the right side face of the triangle.

Figure 12A:
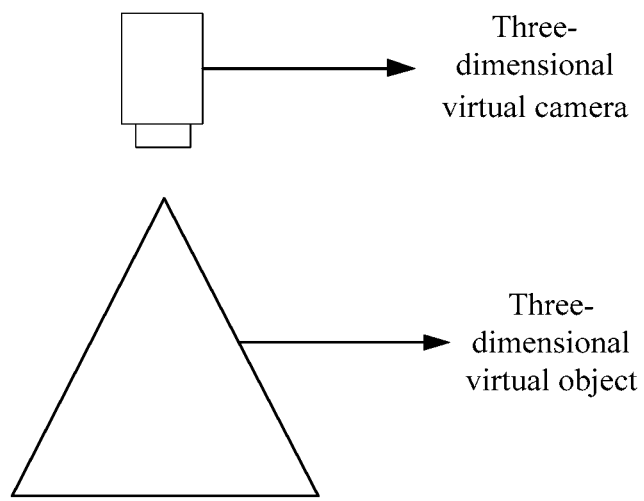
FIGS. 12A-12C are second schematic diagrams of image display effects provided by an embodiment of the present disclosure.
Figure 12B:
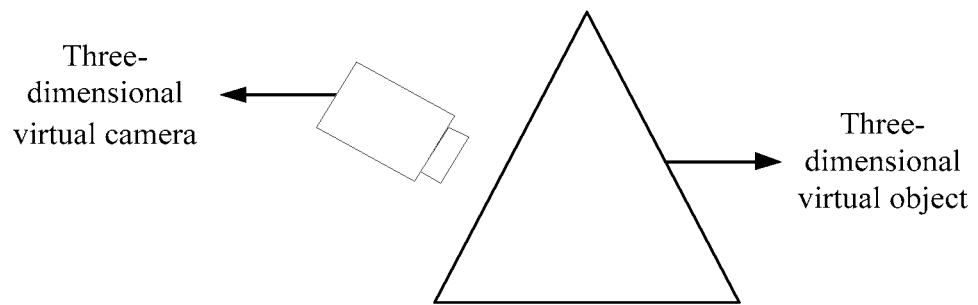
Figure 12C:
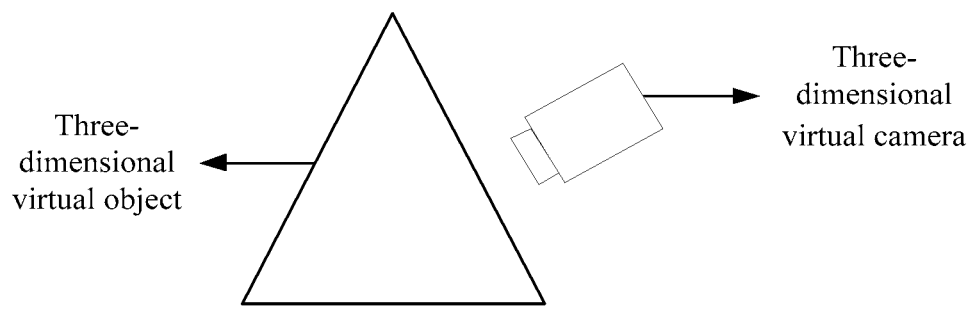

In some embodiments, the position of the three-dimensional virtual camera may be adjusted such that the display angle of the image changes. FIGS. 12A-12C are second schematic diagrams of image display effects provided by an embodiment of the present disclosure.

As shown in FIG. 12A, when the viewer is located in the first viewing region D1, the processor does not process data of the to-be-displayed image, but directly drives the three-dimensional display panel to display the image. If the algorithm adopted by the processor is to use a three-dimensional virtual camera to shoot a three-dimensional virtual object for display, then the three-dimensional virtual camera shoots the front of the triangle, and the viewer can view the front of the triangle.

As shown in FIG. 12B, when the viewer is located in the second viewing region D2, the viewer moves to the left front as compared to the straight front of the three-dimensional display panel, at this time, the three-dimensional virtual camera may be rotated to the left so that the three-dimensional virtual camera can shoot the left side face of the triangle, and the viewer can view the left side face of the triangle.

As shown in FIG. 12C, when the viewer is located in the third viewing region D3, the viewer moves to the right front as compared to the front right of the three-dimensional display panel, at this time, the three-dimensional virtual camera may be rotated to the right so that the three-dimensional virtual camera can shoot the right side face of the triangle, and the viewer can view the right side face of the triangle.

In practical application, any one of the above-mentioned image processing methods may be selected to process the image data so as to enable the display image to adapt to the viewing angle of the viewer. After the display device is started, the detection system first judges the position of the viewer in real time, and sends the position information to the processor in real time. The processor updates and generates a picture in real time according to the position information, and transmits the picture to the three-dimensional display panel, so that the viewer can view the displayed image that conforms to the viewing angle of the viewer.

Though the preferred embodiments of the disclosure are already described, those skilled in the art can make extra changes and modifications to these embodiments once they know a basic inventive concept. Therefore, the appended claims intend to be constructed as including the preferred embodiments and all changes and modifications falling within the scope of the disclosure.

Various modifications and variations may be made to the present disclosure by those skilled in the art without departing from the spirit and scope of the present disclosure. As such, provided that these modifications and variations of the present disclosure fall within the scope of the claims of the present disclosure and their equivalents, the present disclosure is also intended to cover such modifications and variations.

What is claimed is:

1. A display device, comprising:
a three-dimensional display panel, configured to display a three-dimensional image; wherein
a viewing region of the three-dimensional display panel is divided into a first viewing region in a center, and a second viewing region and a third viewing region that are at two sides of the first viewing region, respectively;
a viewing angle corresponding to the first viewing region is equal to a viewing angle corresponding to the second viewing region, and the viewing angle corresponding to the first viewing region is equal to a viewing angle corresponding to the third viewing region; and
a sum of the viewing angle corresponding to the first viewing region, the viewing angle corresponding to the second viewing region, and the viewing angle corresponding to the third viewing region is less than 180°; wherein a viewing angle corresponding to a viewing region is an included angle between two side edges of the viewing region and a center point of the three-dimensional display panel;
a detection system, configured to detect a position of a viewer; wherein
the detection system is a camera group integrally installed on a side edge of the three-dimensional display panel;
the camera group comprises a main body and three cameras, which are a first camera, a second camera, and a third camera, respectively; wherein the first camera is installed on a first side surface of the main body and is configured to shoot an image of the first viewing region, the second camera is installed on a second side surface of the main body and is configured to shoot an image of the second viewing region, and the third camera is installed on a third side surface of the main body and is configured to shoot an image of the third viewing region; and the first side surface is connected with the second side surface and the third side surface; and
a shooting angle of the first camera is equal to the viewing angle corresponding to the first viewing region, a shooting angle of the second camera is equal to the viewing angle corresponding to the second viewing region, and a shooting angle of the third camera is equal to the viewing angle corresponding to the third viewing region; and a sum of the shooting angle of the first camera, the shooting angle of the second camera, and the shooting angle of the third camera is less than 180°;
and
a processor, connected with the three-dimensional display panel and the detection system, and configured to adjust a display angle of a scene in a to-be-displayed image according to the position of the viewer so as to adapt to a viewing angle of the viewer;
wherein the processor is further configured to:
determine that the viewer is currently in the second viewing region when $px<0$, and $-px/py>\tan\theta/2$, and adjust the display angle of the scene in the to-be-displayed image so as to adapt to the viewing angle of the viewer in the second viewing region;

determine that the viewer is currently in the third viewing region when px>0, and px/py>tan θ/2, and adjust the display angle of the scene in the to-be-displayed image so as to adapt to the viewing angle of the viewer in the third viewing region; and determine that the viewer is currently in the first viewing region when px<0, and −px/py≤tan θ/2, or when px>0, and px/py≤tan θ/2, indicate that the viewer is located directly in front of the three-dimensional display panel, and display the to-be-displayed image directly without adjusting the scene in the to-be-displayed image;

wherein (px,py) is position coordinates of the viewer relative to the three-dimensional display panel; and the viewing angle corresponding to the first viewing region, the viewing angle corresponding to the second viewing region and the viewing angle corresponding to the third viewing region are all θ and are connected to each other.

2. The display device according to claim 1, wherein the three-dimensional display panel comprises:

a display screen, comprising a first pixel unit configured to display a left-eye image and a second pixel unit configured to display a right-eye image; and a lenticular lens array at a light-exiting side of the display screen; wherein pixel units of the display screen are on a focal plane of the lenticular lens array.

3. A display method for a display device, comprising:
detecting a position of a viewer;
wherein a detection system is a camera group integrally installed on a side edge of a three-dimensional display panel configured to display a three-dimensional image;

a viewing region of the three-dimensional display panel is divided into a first viewing region in a center, and a second viewing region and a third viewing region that are at two sides of the first viewing region, respectively;

a viewing angle corresponding to the first viewing region is equal to a viewing angle corresponding to the second viewing region, and the viewing angle corresponding to the first viewing region is equal to a viewing angle corresponding to the third viewing region;

a sum of the viewing angle corresponding to the first viewing region, the viewing angle corresponding to the second viewing region, and the viewing angle corresponding to the third viewing region is less than 180°; wherein a viewing angle corresponding to a viewing region is an included angle between two side edges of the viewing region and a center point of the three-dimensional display panel;

the camera group comprises a main body and three cameras, which are a first camera, a second camera, and a third camera, respectively; wherein the first camera is installed on a first side surface of the main body and is configured to shoot an image of the first viewing region, the second camera is installed on a second side surface of the main body and is configured to shoot an image of the second viewing region, and the third camera is installed on a third side surface of the main body and is configured to shoot an image of the third viewing region; and the first side surface is connected with the second side surface and the third side surface; and a shooting angle of the first camera is equal to the viewing angle corresponding to the first viewing region, a shooting angle of the second camera is equal to the viewing angle corresponding to the second viewing region, and a shooting angle of the third camera is equal to the viewing angle corresponding to the third viewing region; and a sum of the shooting angle of the first camera, the shooting angle of the second camera, and the shooting angle of the third camera is less than 180° · and adjusting a display angle of a scene in a to-be-displayed image according to the position of the viewer so as to adapt to a viewing angle of the viewer;

wherein the method further comprises:

determining that the viewer is currently in the second viewing region when px<0, and −px/py>tan θ/2, and adjusting the display angle of the scene in the to-be-displayed image so as to adapt to the viewing angle of the viewer in the second viewing region;

determining that the viewer is currently in the third viewing region when px>0, and px/py>tan θ/2, and adjusting the display angle of the scene in the to-be-displayed image so as to adapt to the viewing angle of the viewer in the third viewing region; and determining that the viewer is currently in the first viewing region when px<0, and −px/py≤tan θ/2, or when px>0, and px/py≤tan θ/2, indicating that the viewer is located directly in front of the three-dimensional display panel, and displaying the to-be-displayed image directly without adjusting the scene in the to-be-displayed image;

wherein (px,py) is position coordinates of the viewer relative to the three-dimensional display panel; and the viewing angle corresponding to the first viewing region, the viewing angle corresponding to the second viewing region and the viewing angle corresponding to the third viewing region are all θ and are connected to each other.

4. The display method according to claim 3, wherein the detecting the position of the viewer comprises:

determining a viewing region where the viewer is located, and determining the viewing region where the viewer is located as an optimal viewing region;

the adjusting the display angle of the scene in the to-be-displayed image according to the position of the viewer comprises:

adjusting the scene in the to-be-displayed image to a display angle adapting to the optimal viewing region.

5. The display method according to claim 4, wherein the determining the viewing region where the viewer is located, and determining the viewing region where the viewer is located as the optimal viewing region comprises:

determining a quantity that indicates how many viewers;
determining the viewing region where the viewer is located as the optimal viewing region when the quantity is equal to 1; and determining the first viewing region as the optimal viewing region when the quantity is greater than 1.

6. The display method according to claim 4, wherein the determining the viewing region where the viewer is located, and determining the viewing region where the viewer is located as the optimal viewing region comprises:

determining a quantity that indicates how many viewers;
determining the viewing region where the viewer is located as the optimal viewing region when the quantity is equal to 1; and determining a viewing region containing the largest quantity that indicates how many viewers as the optimal viewing region when the quantity is greater than 1.

7. The display method according to claim 4, wherein the determining the viewing region where the viewer is located, and determining the viewing region where the viewer is located as the optimal viewing region comprises:
- determining a quantity that indicates how many viewers;
- determining the viewing region where the viewer is located as the optimal viewing region when the quantity is equal to 1; and
- determining a viewing region where a viewer in a middle position is located as the optimal viewing region when the quantity is greater than 1.

8. The display method according to claim 4, wherein the determining the viewing region where the viewer is located, and determining the viewing region where the viewer is located as the optimal viewing region comprises:
- shooting images by the first camera, the second camera and the third camera simultaneously;
- determining, when the first camera shoots an image of the viewer, that the viewer is currently in the first viewing region, and determining the first viewing region as the optimal viewing region;
- determining, when the second camera shoots an image of the viewer, that the viewer is currently in the second viewing region, and determining the second viewing region as the optimal viewing region; and
- determining, when the third camera shoots an image of the viewer, that the viewer is currently in the third viewing region, and determining the third viewing region as the optimal viewing region.

9. The display method according to claim 8, wherein the adjusting the scene in the to-be-displayed image to the display angle adapting to the optimal viewing region comprises:
- displaying the image directly when the viewer is currently in the first viewing region;
- rotating the scene in the to-be-displayed image clockwise by a set angle and then displaying the image when the viewer is currently in the second viewing region; and
- rotating the scene in the to-be-displayed image counter-clockwise by the set angle and then displaying the image when the viewer is currently in the third viewing region; wherein
- the viewing angle corresponding to the first viewing region is equal to the viewing angle corresponding to the second viewing region and the viewing angle corresponding to the third viewing region; the set angle is equal to the viewing angle corresponding to the first viewing region.

\* \* \* \* \*